F. G. Lamson.
Channelling Stone.
No. 87,053. Patented Feb. 10, 1869.
2 Sheets, Sheet 1.
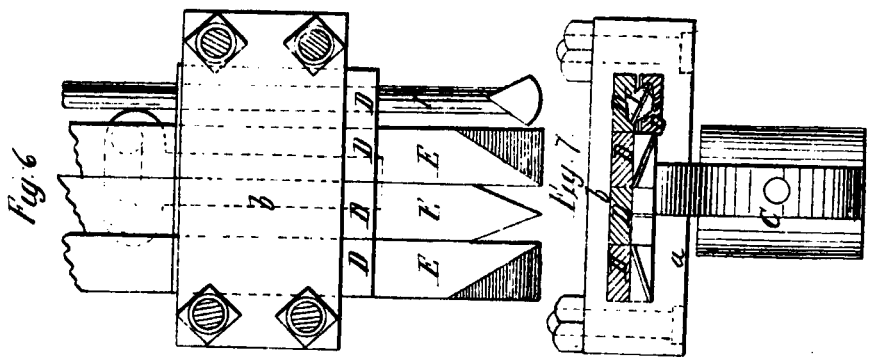
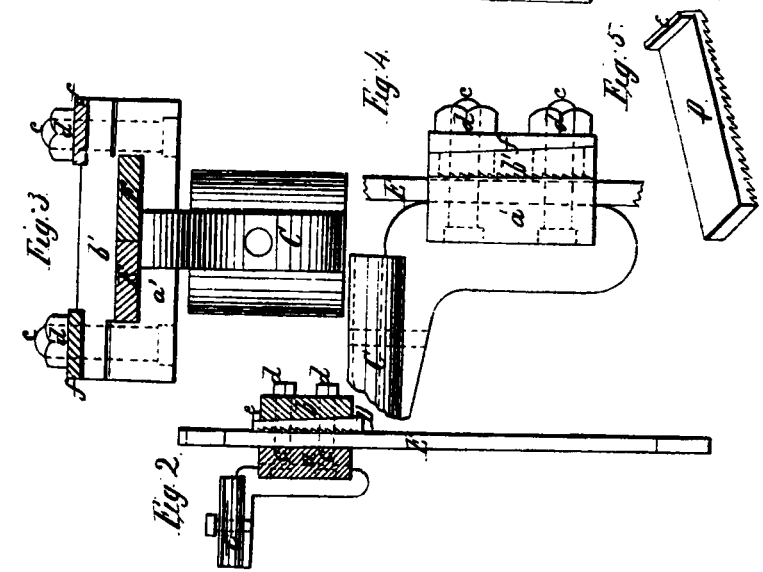
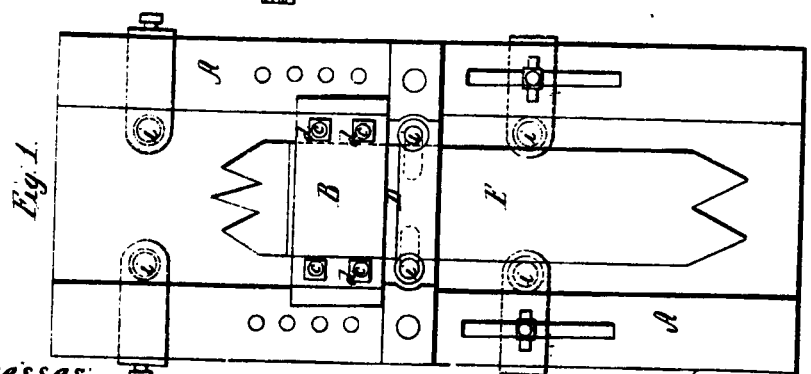
Witnesses,
Leopold Everh
T. H. Yatman
Inventor,
E. G. Lamson
Alexander Mason
Attys.

E. G. Lanson,
Channelling Stone.
No. 87,053. Patented Feb. 10, 1869.
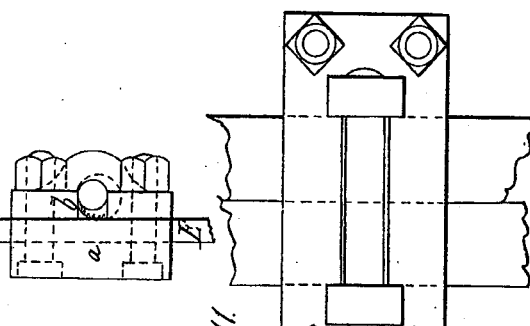
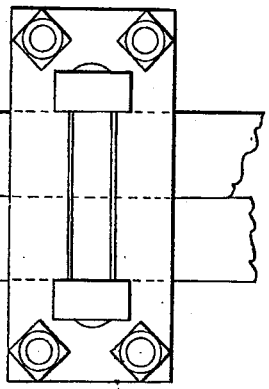
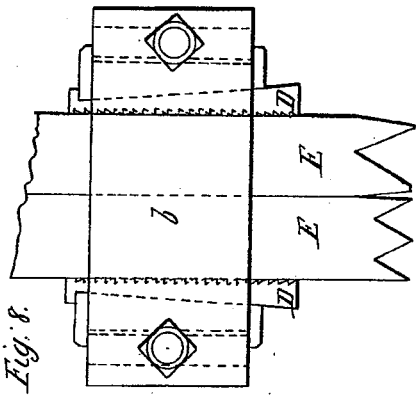
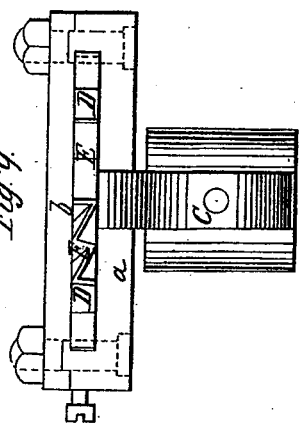
Witnesses:
Leopold Even
A. A. Yeatman
Inventor,
E. G. Lanson
per Chandler & Mason
Attys

E. G. LAMSON, OF WINDSOR, VERMONT.

*Letters Patent No. 87,053, dated February 16, 1869.*

IMPROVED MACHINE FOR CUTTING AND CHANNELLING STONE.

The Schedule referred to in these Letters Patent and making part of the same.

*To all whom it may concern:*

Be it known that I, E. G. LAMSON, of Windsor, in the county of Windsor, and in the State of Vermont, have invented certain new and useful Improvements in Stone-Cutting and Channelling Machine; and do hereby declare that the following is a full, clear, and exact description thereof, reference being had to the accompanying drawings, and to the letters of reference marked thereon.

The nature of my invention consists—

First, in a "self-tightening" clamp, or holder, to hold one or more drills or chisels;

Second, in sharpening said chisels or drills at both ends;

Third, in the use of an adjustable, or movable drill, to keep the channel the proper or any desired width; and Fourth, in devices for guiding the drills or chisels; all of which will be hereinafter fully set forth.

In stone-channelling machines heretofore used, the drills or chisels have been clamped by two clamps, one head-clamp and one foot-clamp, and various methods have been resorted to to keep the drills tight, but it has invariably been found that they soon become loose by use, and must be tightened anew by hand. Besides, the weight, combined with the strain and jar on the drills by two clamps, renders them very liable to become broken and loosened.

My self-tightening clamp obviates all the difficulties heretofore experienced in these respects, as the drills become tighter by use.

In order to enable others skilled in the art to which my invention appertains, to make and use the same, I will now proceed to describe its construction and operation, referring to the annexed drawings, which form a part of this specification, and in which—

Figure 1 is a front view of a drill, with self-tightening clamp, mounted on guides.

Figure 2 is a vertical cross section of the same.

Figure 3 is a plan view, and

Figure 4, a vertical cross-section, illustrating another mode of making the clamp self-tightening.

Figure 5 is a perspective of the toothed wedge used to make the clamp self-tightening.

Figure 6, is a side elevation, and

Figure 7, a plan view of drills clamped with a self-tightening clamp, and having a round drill attached.

Figures 8 and 9, and 10 and 11, show still two other modes by which the clamp may be made self-tightening.

A A represent the guides generally used in stone-channelling machines for guiding the drills, or chisels.

B is the clamp, through which the drill or drills pass.

This clamp is made in two pieces, one the main piece, $a$, which, by an angular piece, C, is connected to the machinery, and the other, a front or cap-piece, $b$.

The ends of the main piece $a$ are provided with perpendicular grooves, in which the guides A A fit, so that the clamp may slide easily up and down on the same.

The front side of the main piece $a$ has a recess of about the same width and depth as the size of the drill or drills which are to be placed therein.

The cap-piece $b$ has, on its inner side, a recess of the same width as the recess in the main piece $a$, but it is tapering in depth, being wider at the bottom than at the top.

The cap-piece $b$ is secured to the main piece $a$ by four bolts, $c$ $c$, which pass through from rear to front, and have nuts, $d$ $d$, placed on their front ends.

A wedge, D, which may be made entirely of steel, or steel-lined, and provided with teeth on its inner side, is inserted from below in the recess of the cap-piece, the toothed side being placed against the drill E.

When, now, the clamp thus constructed, which may be placed at any point on the drill, is tightened as far as possible by the nuts $d$ $d$, and the machine put in motion, it will be readily seen that with every blow on the stone, the drill or drills are moved slightly upward, and the teeth of the wedge, catching on the drills, cause the wedge to be carried upward, the drills by every blow becoming tighter and tighter, until the wedge cannot be carried any higher up, when, of course, the drills are immovable.

Here is the great difference between my clamp and those heretofore constructed.

In the old clamps, every blow has a tendency to, and actually does loosen nuts, bolts, and drills, by the jar and concussion, while in mine, every blow, on the contrary, makes everything tighter and tighter.

To prevent the wedge D from falling when, for any purpose, the nuts $d$ $d$ are loosened, I provide the upper narrower edge of the same with a flange, $e$, which projects over on top of the cap-piece $b$, as seen in fig. 2.

I do not confine myself to this single method of making my clamp self-tightening, as it may be accomplished in many different ways, all clearly involving the same principle.

In the drawings, I have illustrated a few of the ways by which this object may be accomplished, and will here only briefly mention the same.

In figs. 3 and 4, a clamp is shown where the cap-piece itself forms the wedge.

$a'$ is the main piece of the clamp.

$b'$, the cap-piece, which in this case is wedge-shaped, and has no recess on its under side, but is provided with teeth on that side, the same as the wedge D, above described.

On the front side of the cap-piece $b'$, along the edges, are placed wedge-shaped shoes, $f f$, and the bolts and nuts that fasten the clamp are placed as above described, passing through the shoes $f f$ also.

The inclined plane of the wedge-shaped cap-piece $b'$ and the shoes $f$ being the same, a perfectly level bearing is obtained for the tightening-nuts.

The cap-piece E' is provided with elongated slots, through which the bolts pass, so that the cap-piece may slide up when carried by the drills, as above described for the wedge.

In figs. 8 and 9, the wedges are applied to the edges of the drills, instead of the side, in which case the recess in the cap is made wider than the drills, keys are inserted between the edges of said recess and the drills, with screws from the edge of the clamp, for the purpose of loosening the drills when desired.

Figs. 10 and 11 show a toothed cam-wheel, pivoted in a slot of the cap-piece, and operating in the same manner as the wedge.

I may dispense with the teeth on the wedge D, or I may place them in the recess of the main piece of the clamp, or on both, whichever may be considered of the greatest advantage.

The drill B, as shown in fig. 1, is sharpened on both ends, so that when one end is worn out, it can be turned, and answers the same purpose as two sets of drills with the old clamps.

In some of the old clamps, the head-clamp enclosed, and, so to say, rested on the upper edges of the drills, and it was impossible, in using them, to have both ends of the drills sharpened, but when the self-tightening clamp, as herein described, is used, the clamp may be placed at any point of the drill, and thus not interfere with its upper end.

When more than one drill is used in the clamp, and one of them should get broken, or otherwise become shorter than the rest, they can easily be adjusted in this clamp to make their lower ends even, while in the old head-clamps, blocks had to be fitted on the upper ends of the drills to make them even at their lower ends.

Various devices have been resorted to to keep the drills tight, such as notches, or corrugations, or holes, through which pins have been passed, and many others. All of these involve some kind of machine-work, to be made on the drills, to adapt them to the holders.

By using my self-tightening clamp, all such machine-work on the drills is dispensed with, as all that is necessary is to take a bar of steel, of the desired size, sharpen the ends, and it is ready to be inserted in the clamp.

The toothed wedges which I use in my clamp may, of course, be made of any shape, so as to suit any kind of drills, or chisels used, whether flat, square, round, octagon, or any other shape.

For the purpose of keeping the channel at the proper or any desired width, I place an extra drill, I, shown in figs. 6 and 7, in addition to the regular chisel or chisels in the clamp.

It is well known that the points of the drills, or chisels, will gradually wear off, or perhaps be broken off, and thus the channel will grow narrower as it goes down. By now placing an additional drill, the point of which is of the peculiar shape shown in the drawings, that is, spreading, so as to be wider than the drill itself, in advance of the other drills, the channel is kept at a uniform width.

As the edges of the point on the drill I wear off, it is only necessary to slightly loosen the clamp, when said extra drill can be easily turned so that the point crosses the channel, and thus the channel may be kept the same width throughout, without sharpening the drills.

I prefer making the extra drill I round, as a round drill is easier adjusted than a drill of any other shape, although the shape of the drill is immaterial.

In addition to the standard guides A A, which fit into grooves on the main piece of the clamp, to guide the same, I employ flanged rollers, $i\ i$, to guide the drills.

These rollers are arranged on bars, which are secured to the standard-guides A A, in such a manner as to be easily adjusted in any direction, to accommodate the rollers to any size drills desired to be used.

One roller is placed against each edge of the drill, and the flanges project on both front and rear sides of the drills.

The rollers $i\ i$ may be used at upper or lower ends of drills, or on both, in which latter case I may dispense with the guide on the clamp, or holder.

Having thus fully described my invention,

What I claim as new, and desire to secure by Letters Patent, is—

1. A clamp, or holder, for securing one or a series of drills, or chisels, in a stone-drilling, cutting, or channelling machine, that is self-tightening, substantially as set forth.

2. A wedge, either with or without teeth, or corrugations, when used for self-tightening a clamp that holds one or more drills, or chisels, substantially as herein set forth.

3. A clamp which holds the drills, or chisels, in a stone-cutting, drilling, or channelling machine, by cam or wedges, as described, and continues to tighten by use, substantially as herein set forth.

4. In combination with a self-tightening clamp, or holder, as described, a drill, or chisel, sharpened at both ends, substantially and for the purpose as herein set forth.

5. Running the upper or lower ends of drills in a stone-cutting, drilling, or channelling machine between adjustable flanged rollers, to guide the drills, in combination with the guide on clamp, or holder, the whole substantially as herein set forth.

6. The adjustable drill in a stone-cutting, drilling, or channelling machine, to keep the channel the proper or any desired width, substantially as herein set forth.

7. The combination of the drill-clamp, or holder, with its drill, or drills, arranged in connection with a stone-channelling, cutting, or drilling machine, between standard-guides, to operate outside of the frame and track, substantially as set forth.

8. In combination with the drills and standard-guides, adjustable rollers, so arranged as to allow the lateral as well as the horizontal adjustment of the drills, substantially as herein set forth.

In testimony that I claim the foregoing, I have hereunto set my hand, this 23d day of January, 1869.

E. G. LAMSON.

Witnesses:
LEOPOLD EVERT,
A. A. YEATMAN.